United States Patent Office 3,728,262
Patented Apr. 17, 1973

3,728,262

METHOD OF MANUFACTURING A MAGNETIC TAPE LACQUER

Hendrikus Johannes Lemmen, Johannes van Ruler, and Pieter Cornelis Scholten, Emmasingel, Eindhoven, Netherlands, assignors to U.S. Philips Corporation, New York, N.Y.

No Drawing. Filed Mar. 8, 1971, Ser. No. 122,097
Claims priority, application Netherlands, Mar. 18, 1970, 7003810
Int. Cl. H01f *1/26*
U.S. Cl. 252—62.54 3 Claims

ABSTRACT OF THE DISCLOSURE

A method of manufacturing a magnetic tape lacquer in which a polymer is used as a dispersing agent for the magnetisable particles. When using hydrolized vinylchloride-vinyl acetate, suitable solvents are 1,2-dichloroethane, diisobutylketone and nitrobenzene.

The invention relates to a method of manufacturing a magnetic tape lacquer in which during a first stage a dispersion of magnetisable particles in an organic solvent is prepared while using a polymeric material as a dispersing agent, whereafter a lacquer binder is added to the dispersion during a second stage. The invention also relates to magnetic tapes obtained by providing the magnetic tape lacquer according to the invention on a support.

Magnetic tapes having a high signal and a low noise level can only be obtained if in the manufacture of the magnetic tape lacquer, which is used for the manufacture of these tapes, an optimum homogeneous dispersion of the magnetisable particles in the lacquer is obtained. Magnetisable particles easily constitute aggregrates. By grinding in ball mills or pearl mills in the presence of dispersing agents and a solvent, it is attempted to desintegrate these aggregates. Usually it takes several hours of grinding before a more or less homogeneous dispersion is obtained, in which the aggregates are sufficiently small. However, when grinding for a long period a steadily increasing part of the magnetisable particles is damaged. In the finished tape this becomes manifest in a decrease of the signal level.

The use of polymeric dispersing agents is known per se from literature (see, for example, United Kingdom patent specifications 1,058,426 and 1,132,957).

Polymers are used as dispersing agents because these are much more effective than the conventional dispersing agents such as oleic acid and lecithine for the dispersion of magnetisable particles. For the action of a polymer as a dispersing agent, it is necessary that the polymer is adsorbed on the particles. In view of the polar character of the particles to be dispersed, a polymer which carries polar groups is most suitable for this purpose. The solvent must not disturb this adsorption; this means that the solvent must not adsorb on the particles to a stronger extent than the polymeric molecules and that the solvatation of the polymeric molecules must not be of such a nature that the polar groups are shielded thereby.

An object of the present invention is to provide a method of manufacturing magnetic tape lacquers by which high quality magnetic tapes can be manufactured. A further object of the invention is to avoid the use of low molecular dispersing agents.

According to the invention this method is characterized in that during the first stage a solution is prepared of a partially hydrolyzed copolymer of vinylchloride and vinyl acetate containing 3 to 10% of vinyl alcohol in a solvent chosen from the group formed by 1,2-dichloroethane, diisobutylketone, nitrobenzene and mixtures of these solvents having a viscosity of between 4 and 15 cp. in which 3 to 7 vol. percent of magnetisable particles are dispersed, whereafter a lacquer binder is added to the dispersion during the second stage.

The invention is based on the recognition of the fact that for obtaining an optimum result the non-adsorbed parts of the adsorbed polymer molecules must greatly swell in the solvent so that the layer of polymer molecules adsorbed on the particles is very extensive and that the optimum degree of homogeneity can only be achieved if in the manufacture of the dispersion during the first stage both the concentration of the polymeric dispersing agent and that of the magnetisable particles is chosen to be low and within the given limits. An optimum dispersion is obtained when the concentration of the polymer is such that the viscosity of the solution is between 4 cp. and 15 cp. A known copolymer of the type used in the method according to the invention is a product marketed under the name of VAGH by Union Carbide and Chemical Corporation: in addition to approximately 91 mol percent of vinylchloride and approximately 3 mol percent of vinyl acetate it contains approximately 6 mol percent of vinyl alcohol.

It was found that when using polymers of this type the above-mentioned requirements are satisfied only when using the solvents: 1,2-dichloroethane, diisobutylketone (2,6-dimethyl-4-heptanone), nitrobenzene and mixtures of these solvents. When using other conventional lacquer solvents, the polymers of the described type cannot act as a dispersing agent for magnetisable particles.

It was found that the use of low molecular dispersing agents in the lacquers manufactured in accordance with the method according to the invention is unnecessary and generally has a detrimental effect on the quality of the magnetic tape manufactured with such a lacquer.

The method according to the invention is suitable for the manufacture of magnetic tape lacquers which contain the conventional magnetisable materials. When manufacturing the lacquers the following materials may be used, for example: metallic magnetic materials such as iron particles or oxidic magnetic materials such as gamma iron oxide ($\gamma$-$Fe_2O_3$), magnetite ($Fe_3O_4$) chromium dioxide ($CrO_2$) or ferrites. When using more than 5 vol. percent of magnetisable material the signal-to-noise ratio of the tapes obtained when using such lacquers decreases. However, suitable tapes can still be obtained up to a concentration of approximately 7 vol. percent. At more than 7 vol. percent the signal level generally decreases too sharply to enabling the manufacture of suitable tapes.

When using less than 3 vol. percent of magnetisable material, difficulties are experienced which relate to the relatively large quantity of solvent which is then present in the dispersion.

After the dispersion is obtained during the first stage, a lacquer binder is added during the second stage. It is not necessary that this binder is the same as the polymer which is used in preparing the dispersion but the character of the medium may not change thereby to such a great extent that the action of the first polymer as a dispersing agent is annihilated. Suitable for use as a lacquer binder may be post-chlorinated polyvinylchloride, vinylchloride-vinylacetate copolymers and hardenable or non-hardenable polyester resins or polyurethane resins. The materials optionally to be added to the magnetic tape lacquer, such as lubricants, plasticisers and antistatic means must be chosen carefully. They must not be able to repel the polymer adsorbed on the magnetic particles or change the character of the solvent drastically.

Generally the use of materials having strong polar groups must be avoided.

Silicon oils may be used, for example, as lubricants.

During the first stage of the method according to the invention a dispersion is obtained by grinding the mixture of magnetisable particles, dispersing agent and solvent in a ball or pearl mill for several hours.

After a homogeneous dispersion is obtained in this manner, a lacquer binder is added and grinding is continued for several hours so as to distribute the added lacquer binder homogeneously.

The magnetic tape lacquer according to the invention may be provided on the conventional supports such as foils of polyvinylchloride, cellulose acetate and polyethylene terephthalate. Optionally, an intermediate layer enhancing the adhesion may be used. The lacquers may alternatively be provided on aluminium drums, discs etc. or on a further non-magnetic material.

The lacquers are provided on the supports in accordance with methods which are conventional in the manufacture of magnetic tapes, for example, by means of pouring or spraying.

After the particles are provided on the support, they can be aligned by means of a method suitable for this purpose in the lacquer layer which is not yet dry.

A preferred embodiment of the invention for the manufacture of a magnetic tape lacquer is characterized in that a solution is prepared of a partially hydrolized copolymer of vinylchloride and vinylacetate containing approximately 91 mol percent of vinylchloride, approximately 3 mol percent of vinylacetate and approximately 6 mol percent of vinylalcohol in diisobutylketone which contains 2 to 6 gms. of copolymer per 100 gms. of solution in which 20 to 35 gms. of oxidic magnetisable particles are dispersed, whereafter so much quantity of the same copolymer is added to the dispersion that the total quantity lies between 25 and 55 gms. per 100 gms. of magnetisable material.

This embodiment has the advantage that the adsorption balance of the dispersing agent cannot be disturbed by the added binder.

In order that the invention may be readily carried into effect, it will now be described in detail by way of the following examples.

EXAMPLE 1

50 gms. of needle-shaped gammairon oxide were dispersed for 16 hours in a pearl mill together with 200 gms. of a 4% solution of VAGH in diisobutylketone (viscosity 6.5 cp.). Subsequently, 17.1 gms. of VAGH powder were added, heated to 70° C. and intensively mixed for two hours. After cooling 1.35 gms. of silicon oil were added and stirring took another 1½ hours. The suspension was separated from the balls and provided on a polyester foil. After drying and calendering this tape has the very satisfactory signal and noise properties mentioned in the table.

EXAMPLE 2

50 gms. of needle-shaped magnetic chromium dioxide powder were dispersed with the aid of a pearl mill (as in Example 1) in 200 gms. of a 3% solution of VAGH in diisobutylketone (viscosity 5 cp.). After 5 hours of dispersion the material was slowly heated to 70° C. During the heat treatment 9.6 gms. of solid VAGH were added. Subsequently, the heat treatment was continued for 1 hour at 70° C. and then the material was cooled. No silicon oil was added to this suspension. The properties of the tapes obtained with this suspension are mentioned in the table and are compared with high-quality tapes which are commercially available.

TABLE

| | Material | Output, wavelength | | Bias noise, wavelength | | Ratio of output and bias noise wavelength | |
|---|---|---|---|---|---|---|---|
| | | 3μ | 10μ | 3μ | 10μ | 3μ | 10μ |
| Commercial band I [1] | $\gamma Fe_2O_3$ | 200 mv. ≡0 db | 3,400 mv. ≡0 db | 1.1 mv. ≡0 db | 3.8 mv. 0 db | 45 db | 59 db |
| Commercial band II | $\gamma Fe_2O_3$ | −3 | −1 | 0 | +0.8 | 42 | 58.2 |
| Example 1 | $\gamma Fe_2O_3$ | 0 | 0 | −4 | −5.8 | 49 | 64.8 |
| Commercial band III | $CrO_2$ | +5 | +2.2 | +1 9 | +1.0 | 48.1 | 60.2 |
| Example 2 | $CrO_2$ | +4.6 | +3.4 | −0 9 | −0.2 | 50.5 | 62.6 |

[1] Equals reference level.

What is claimed is:

1. A method of manufacturing a magnetic tape lacquer which method comprises forming a dispersion of 3 to 7 vol. percent of magnetic particles in a solution of a hydrolized copolymer of vinyl acetate and vinyl chloride containing about 3 to 10% of vinyl alcohol in a solvent selected from the group consisting of 1,2-dichloroethane, diisobutylketone, nitrobenzene and mixtures thereof, the amount of said copolymer dissolved in said solvent being such that the resultant solution has a viscosity of between 4 and 15 cp. and then adding a lacquer binder to said dispersion, said lacquer binder being selected from the group consisting of polyvinyl chloride, polyvinyl acetate copolymer, polyester resins and polyurethane resins.

2. A method of preparing a magnetic tape lacquer said method comprising forming a dispersion of oxidic magnetizable particles in a solution of a partially hydrolized copolymer of vinyl chloride and vinyl acetate containing about 91% of vinyl chloride, about 3% of vinyl acetate and about 6% of vinyl alcohol in diisobutyl ketone, the amount of said copolymer being such that per 100 grams of solution about 2 to 6 grams of copolymer are present and the amount of said magnetizable particles added to 100 grams of said solution is between about 20 to 35 grams and then adding such an additional quantity of said copolymer to said dispersion that for each 100 grams of magnetizable particles about 25 to 55 grams of said copolymer is present.

3. A magnetic tape lacquer prepared according to the method of claim 2.

References Cited

UNITED STATES PATENTS

| | | | |
|---|---|---|---|
| 3,149,995 | 9/1964 | Bauer | 252—62.54 |
| 3,175,984 | 3/1965 | Paulson et al. | 252—62.54 |

FOREIGN PATENTS

| | | |
|---|---|---|
| 1,058,426 | 2/1967 | Great Britain. |

DANIEL E. WYMAN, Primary Examiner

A. P. DEMERS, Assistant Examiner

U.S. Cl. X.R.

117—235

PO-1050
(5/69)

UNITED STATES PATENT OFFICE
CERTIFICATE OF CORRECTION

Patent No. 3,728,262 (PHN 4727) Dated April 17, 1973

Inventor(s) HENDRIKUS JOHANNES LEMMEN ET AL

It is certified that error appears in the above-identified patent and that said Letters Patent are hereby corrected as shown below:

Column 1, lines 34 and 35, line 43, line 52;
Column 2, line 2, line 13, line 30, line 38, line 44;
Column 3, line 3, change "magnetisable" to -- magnetizable--.

Column 1, line 35, change "constitute" to -- form --.

Column 1, line 37, change "is" to -- has been --.

Column 1, line 51, change "lecithine" to -- lecithin --.

Column 3, line 30, change "aluminium" to -- aluminum --.

Column 3, line 60, change "gammairon" to -- gamma iron --.

Signed and sealed this 27th day of November 1973.

(SEAL)
Attest:

EDWARD M.FLETCHER,JR.
Attesting Officer

RENE D. TEGTMEYER
Acting Commissioner of Patents